April 14, 1959 J. H. MORAWITZ ET AL 2,882,349

ROCKER TELEPHONE STAND

Filed Jan. 17, 1957

INVENTORS.
JOHN H. MORAWITZ
JOHN C. BURGER
BY Wade Koontz
ATTORNEY and
Arthur R. Parker
AGENT United States Patent Office 2,882,349

Patented Apr. 14, 1959

2,882,349

ROCKER TELEPHONE STAND

John Henry Morawitz and John C. Burger, Yuma, Ariz.

Application January 17, 1957, Serial No. 634,799

7 Claims. (Cl. 179—147)

(Granted under Title 35, U. S. Code (1952), sec. 266)

The invention described herein may be manufactured and used by or for the United States Government for governmental purposes without payment to me of any royalty thereon.

This invention relates generally to a telephone stand and, more particularly, to a rocker-type stand to be mounted between adjoining office desks.

In business offices, including military offices, it occurs frequently that desks are placed back-to-back and, if not, then the double-type desk is utilized. In either event, it is normal to utilize only one telephone to serve both occupants in order to economize. Usually an attempt is made to position the single telephone at a point approximately equidistant from both users and, in practice, this involves considerable stretching and arising from the seated position in order that one user or the other may use said telephone. This considerable inconvenience and wasted effort is particularly accented when one or the other of said adjoining users is absent from his desk. The above practice, naturally, creates an extremely inconvenient and frustrating atmosphere, and, further, involves a substantial interruption of work and train of thought especially where frequent use of the telephone is necessary.

The above difficulty may be solved either with the use of additional telephone outlets or extensions which, in a large office, could amount to a substantial increase in cost or might not be feasible with the particular office arrangement and space available. The present invention utilizes an arrangement wherein the inconvenience and frustration inherent in the above-described situation is substantially eliminated and yet involves a simple and low cost though unique device which facilitates the use of a single telephone by the occupants of adjoining desks.

An object of the invention, therefore, is to provide an improved means which facilitates the use of a single telephone by the occupants of adjoining desks in a business office.

A further object of the invention resides in the provision of a single telephone transfer device which eliminates the considerable reaching and stretching by users of adjoining desks inherent in the normal telephone arrangement.

A still further object of the invention involves the utilization of a tiltable telephone support mounted within normal reaching distance to transfer the telephone from one user to another where adjoining desks positioned back-to-back or the double-desk is employed.

Another object of the invention is in the use of a telephone stand incorporating the "seesaw" or rocker-arm principle to provide movement of a single telephone from one position to another without the considerable wasted effort found in the usual office arrangement.

Other objects and advantages of the invention will become apparent from the following description, taken in connection with the accompanying drawings, in which like reference characters refer to like parts in the several figures.

It is pointed out that although the following description is had with reference to a rocker stand and tray having a specific size and referred to as "rectangular" in shape, this does not represent any limitation on the invention but is representative only of one arrangement which may be utilized with the invention depending on the type of desk and office space available.

Figure 1:
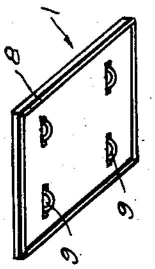
Figure 1 is a bottom perspective view of the wheeled or rollered telephone tray or plate utilized in the invention.
Figure 2:
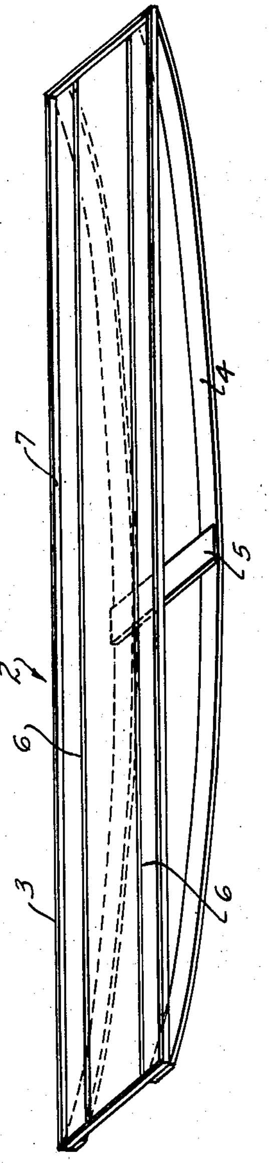
Figure 2 is a top perspective view of the rocker stand utilized in the invention and adapted to support the tray or plate of Figure 1, illustrating the rocker arms in mounted condition on the upper or tracked portion of said stand.

As clearly seen in the drawings, the device of the instant invention consists of two main elements, the plate or tray 1 of Figure 1 and the rocker stand indicated generally at 2 in Figure 2 on which stand said plate or tray 1 is adapted to be slidably mounted. Said plate 1 and rocker stand 2 may be constructed of any available suitable material, as for example, molded plastic, plywood, or thin sheet steel. By utilizing molded plastic the need for bolts, rivets or other means for joining the several parts is eliminated. Moreover, said rocker stand 2 may be made in any desired length and width; however, it is practical and desirable to select a length and width of approximately 48" and 6", respectively, with the normal size office desk.

Figure 3:
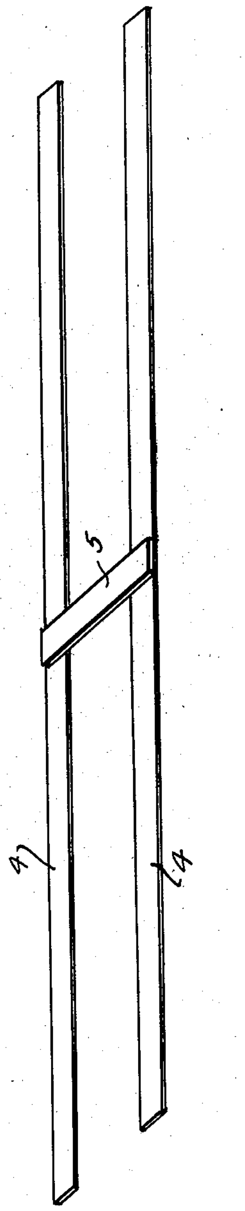
Figure 3 is a top perspective view of the rocker arms utilized with the rocker stand of Figure 2, illustrating their unflexed or unbowed condition prior to assembly with the upper or tracked portion of said stand.

Referring specifically to Figure 2 of the drawings, the rocker stand indicated generally at 2 consists of a rectangular shaped flat platform or slide 3 approximately $\frac{3}{16}$" thick, a pair of parallel rocker arms 4 affixed at each end to the underside of said platform or slide 3 and bowed in the middle, and a single cross-bar 5 rigidly fixed to and extending between the mid-point of each of said rocker arms 4 at right angles thereto. Said rocker arms 4 are preferably made of spring steel and by reason of being "bowed" in the middle form a "seesaw" effect when a load placed on top of said platform or slide 3 is shifted to a point on either side of the mid-point thereof. At this point it is noted that each rocker arm 4 is approximately 50¼" in length when in its flattened or unflexed condition as in Figure 3 wherein a pair of said rocker arms 4 with the cross-bar 5 affixed thereto is illustrated prior to its attachment to the underside of said platform or slide 3. With a length of 50¼", the opposite ends of each arm 4 is joined to the respective opposite corners of said platform or slide 3 and since the latter is approximately 48" in length, it is necessary to flex each of said rocker arms 4 to form a bow or "rocker" effect which extends approximately 4" below the bottom of said platform or slide 3 at the mid-point of each arm 4. Said rocker arms 4, in addition to being 50¼" in length, are 1¼" wide and $\frac{1}{16}$" thick. The cross-bar 5 therebetween is 8¼" in length, 1¼" in width, and $\frac{1}{16}$" thick. With this arrangement, the rocker stand 2 is mounted on a pair of rigidly mounted spring steel rocker arms 4 to effect an extremely stable and rugged base element to support the plate or tray 1 of Figure 1 when in mounted condition. Said platform or slide 3 includes a pair of parallel grooved tracks 6, ¼" deep and rounded to $\frac{3}{16}$" in width at the top extending lengthwise on the upper or top surface thereof in which tracks 6, said plate or tray 1 is slidably engaged during operation of said rocker stand 2 in a manner to be hereinafter explained in detail. Furthermore, said platform or slide 3 incorporates sides 7 which are $\frac{3}{32}$" in thickness and raised approximately ½" around the outside of said platform or slide 3 to prevent said tray or plate 1 from sliding completely off said tracks 6 when in operation.

With particular reference to Figure 1 of the drawings, the tray or platform indicated generally at 1 consists of any hard plastic material rectangular in shape to conform to the rocker stand 2 of Figure 2 and 8¼" in length, 5½" in width, and ³⁄₃₂" thick. Said tray or plate 1 also includes sides 8 raised approximately 1" to enable a telephone to be supported thereby without the danger of sliding off. Extending beneath the undersides of said tray or plate 1 are four wheels or rollers 9 mounted in pairs on longitudinal and transverse centerlines parallel and at right angles to each other. Said pairs of wheels or rollers 9 are positioned a distance apart equal to that of the parallel grooved tracks 6 in said platform or slide 3 so that when said tray or plate 1 is mounted on top of the rocker stand 2, said wheels or rollers 9 slidably engage within said grooved tracks 6. Said wheels or rollers 9 are made of any desirable metal; however, they should not be constructed of a ferrous type metal similar to that used with the platform or slide 3 in order to insure quietness of operation.

To summarize the operation of the instant device, a rocker stand 2 consisting of an elongated platform or slide 3 mounted on a pair of rocker arms 4 and having grooved tracks 6 on the upper surface thereof is positioned symmetrically between two adjoining desks, a tray 1 adapted to support a telephone and having a plurality of rollers 9 is mounted on top of said platform or slide 3 with said rollers 9 in guiding engagement within said grooved tracks 6, and when one of the occupants of said adjoining desks desires to use the telephone it is only necessary to depress his end of said rocker stand 2 to cause said rollered tray 1 to slide towards said depressed end to carry the telephone to a convenient position. Of course, once said rollered tray 1 passes the mid-point in its travel said rocker stand 2 will automatically "see-saw" or rock to the fully depressed position.

Thus, the rocker stand of the present invention involves a unique and yet simple device that eliminates wasted effort, improves economy of operation, reduces overhead cost, and substantially reduces to a minimum the inconvenience of joint users served by a single telephone and thus largely increasing their efficiency.

We claim:

1. A telephone rocker stand adapted to support a telephone comprising a flat rigid elongated upper surface, rocker means mounted on the bottom of said upper surface, longitudinal guide means on said flat upper surface, and a tray adapted to support a telephone in slidable engagement with said guide means.

2. A telephone rocker stand as in claim 1, said tray having a plurality of rollers mounted on the bottom thereof in slidable engagement with said longitudinal guide means, said stand tiltable to slide said tray to a predetermined point at an intermediate position at which point a tilting force is applied to said stand to slide said tray to one end of said stand.

3. A telephone stand comprising a tiltable base element having a symmetrical convex bottom surface, a second element adapted to support a telephone in engagement with said base element, and means for facilitating movement of said second element relative to said base element.

4. A stand for a telephone comprising a main support element having a bowed rocker base, a second support element adapted to cradle a telephone, and means mounted on said second support element in engagement with said main support element to move said second support element from one end of said main support element to the other end on application of a tilting movement to one end of said bowed rocker base.

5. A support for a telephone utilized by the adjoining occupants of adjacent desks comprising, an elongated slide, a rocker element mounted on the bottom side of said slide, said slide having grooved tracks on the upper surface thereof, a stand adapted to support a telephone having two pairs of wheels fixedly positioned on opposite sides of the bottom surface thereof in slidable engagement with said grooved tracks to move said stand towards one end of said slide as said slide is tilted towards said one end by one of said adjoining occupants.

6. A support as in claim 5, said rocker element consisting of two flat rocker arms mounted in bowed condition on opposite sides of said slide and a reinforcing element extending at right angles between the midpoints of said two rocker arms on the lowest point thereof to provide rigid support for said slide.

7. A telephone support comprising a relatively large base element having a pair of curved arms affixed on the bottom thereof and a pair of parallel grooves separated by a predetermined distance machined in the top thereof, a relatively small telephone support element adapted to support a telephone, and means for operably engaging said telephone support element with said base element, said means comprising two pairs of rollers mounted in parallel on the bottom surface of said telephone support element, one of said pairs of rollers being separated from the other of said pairs of rollers by a distance equal to that between said grooves, said rollers operably engaging said tracks upon mounting said telephone support element on top of said base element, said base element being tiltable to slide said telephone support element in the direction of tilt to transfer the telephone carried thereby toward a prospective user.

References Cited in the file of this patent

UNITED STATES PATENTS

| | | |
|---|---|---|
| 2,414,110 | Lee et al. | Jan. 14, 1947 |
| 2,495,006 | Holmes | Jan. 17, 1950 |